UNITED STATES PATENT OFFICE.

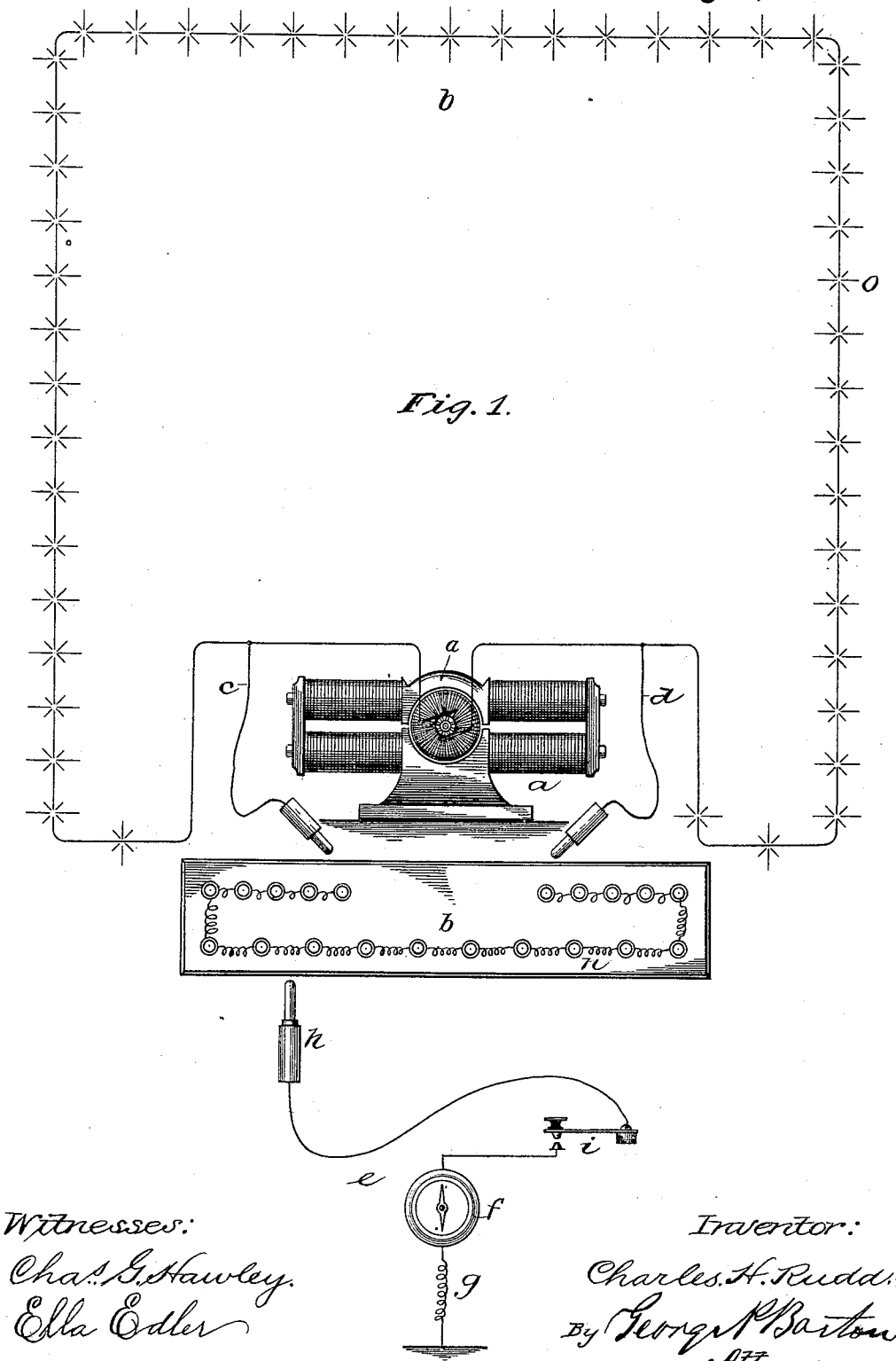

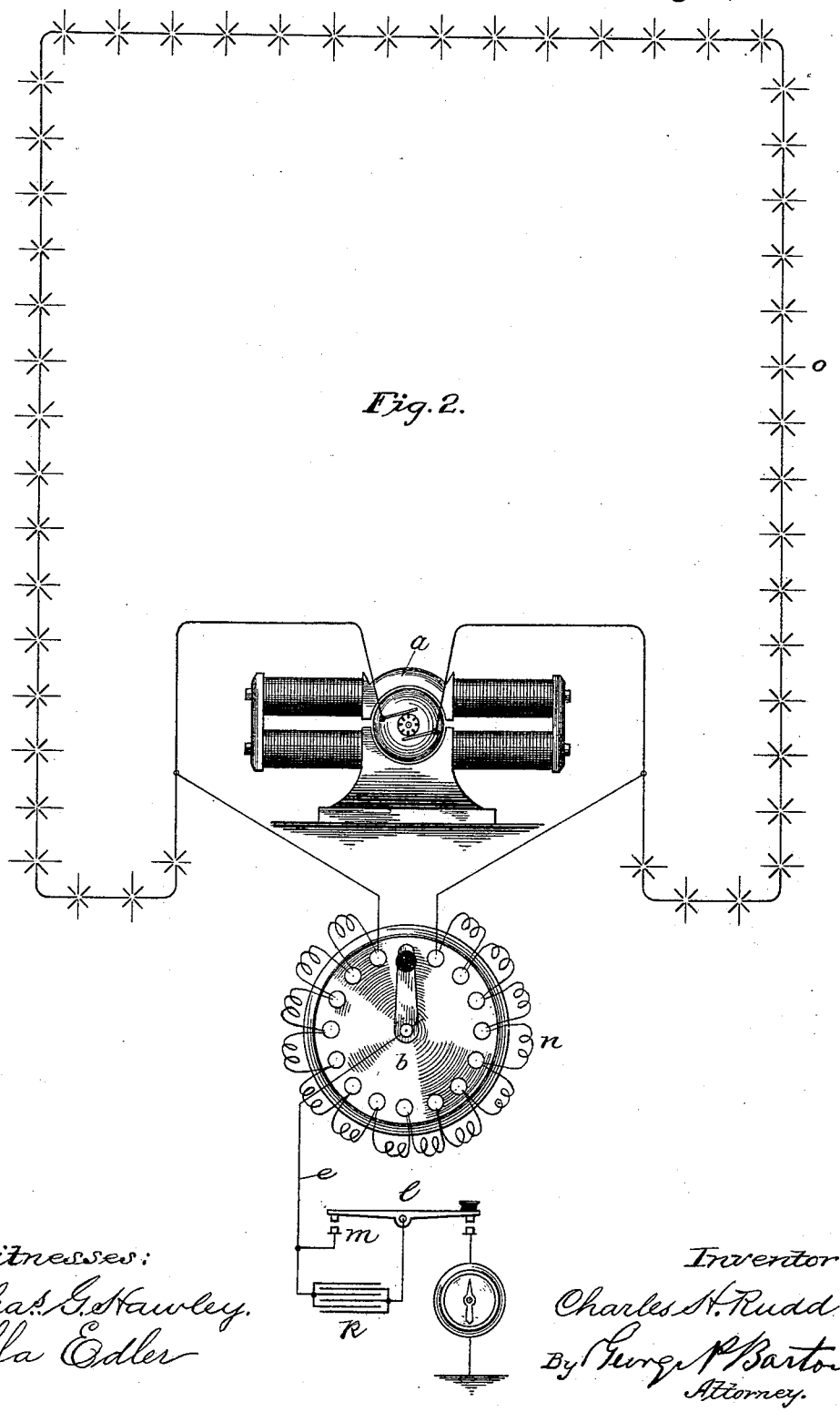

CHARLES H. RUDD, OF EVANSTON, ASSIGNOR TO THE WESTERN ELECTRIC COMPANY, OF CHICAGO, ILLINOIS.

TESTING APPARATUS FOR ELECTRIC-LIGHTING CIRCUITS.

SPECIFICATION forming part of Letters Patent No. 480,038, dated August 2, 1892.

Application filed December 10, 1888. Serial No. 293,124. (No model.)

*To all whom it may concern:*

Be it known that I, CHARLES H. RUDD, a citizen of the United States, residing at Evanston, in the county of Cook and State of Illinois, have invented a certain new and useful Improvement in Apparatus for Indicating the Location of Accidental Ground Connections on Lamp-Circuits, (Case No. 6,) of which the following is a full, clear, concise, and exact description, reference being had to the accompanying drawings, forming a part of this specification.

In the operation of arc lamps in series it is of the greatest importance that the entire circuit should be insulated and that there should be no leaks or accidental connections to ground. In case of an accidental ground connection at any point of the circuit the circuit becomes at once dangerous, since there is a tendency to form another ground at some other point of the circuit, which would be liable to result in loss of property and life.

My invention has for its object the localization of the first or initial accidental ground that may be formed in order that the damage may be repaired.

My invention consists in providing a rheostat and means for connecting the opposite ends thereof to different sides of the dynamo-machine or other electric generator when connected in the lamp-circuit, and in a ground branch including a galvanometer, and having a movable terminal, as more particularly described and claimed herein. By changing the connection of the ground circuit to different parts of the rheostat the neutral point of the rheostat with respect to any accidental leaks upon the lamp-circuit may be found. This point being determined and the entire resistance of the rheostat being known, the location of the leak on the lamp-circuit will be determined approximately by the position of the neutral point thus found in the rheostat with respect to the resistance of the rheostat on opposite sides of said neutral point. The position of the neutral point relatively to the resistance of the rheostat on opposite sides of said point will indicate the position of the leak relatively to the lamps on different sides of said leak. In the ground branch containing the galvanometer I have sometimes included a resistance-coil sufficient to prevent liability of taking a dangerous or wasteful current. I have also sometimes used a condenser for the same purpose. Any suitable means may be used for connecting this branch circuit between the different coils of the rheostat. I preferably use a plug at the end of a flexible cord, and in connection therewith have sometimes found a key convenient, so arranged that the branch may be closed only momentarily at the proper time.

My invention is illustrated in the accompanying drawings, in which—

Figure 1 is a diagram of an electric-lamp circuit provided with my apparatus for locating accidental ground connections thereon. Fig. 2 is a view showing the ground branch provided with a condenser, a key being shown in connection with the condenser with a back contact for discharging the condenser, the movable connection between the branch $e$ and the rheostat being a pivoted lever.

The dynamo-machine $a$ is shown connected in the usual manner in the circuit containing fifty lamps. The rheostat $b$ may have a resistance of a hundred thousand ohms, altogether this may consist of ninety-eight coils of a thousand ohms and twenty coils of a hundred ohms each, the twenty coils being at the different ends of the rheostat near the dynamo—that is, ten of such coils of one hundred ohms being at each of the ends. It will be understood that the number of coils and their disposition are a mere matter of mechanical arrangement. Any suitable means may be provided for connecting this rheostat to the different sides of the dynamo. Simple switches or flexible cords, as $c\ d$, provided with terminal plugs, as shown, may be used.

The ground branch $e$ includes a galvanometer $f$. Resistance $g$ may also be included in said ground branch. A plug $h$, connected with a flexible cord, may be used as a terminal for this ground branch, this plug being adapted to be inserted between any of the coils of the rheostat. I preferably provide, also, a key $i$ in said ground branch, in order that the circuit may be closed only momentarily.

In Fig. 2 I have shown a condenser $k$ in the ground circuit $e$ and a key $l$ provided with a back contact $m$ so arranged that the condenser may be discharged every time after the circuit has been closed.

It is well known that if a ground connection is made at any point of the lamp-circuit when the rheostat is connected between the poles of the machine that there will be somewhere in said rheostat a neutral point with respect to said leak—that is to say, a point from which no current will be derived on account of the leak. Therefore when this neutral point is determined and the number of lamps being known, the location of the leak with respect to the lamps will be known— that is to say, suppose the neutral point were found to be at $n$ having three times as much resistance on one side as on the other, it would be known that the leak must be in the same position relatively in the lamp-circuit. This would be at point $o$—that is to say, the resistance of the rheostat on different sides of $n$ being as three to one, the leak would be found, theoretically, at the center of the thirteenth lamp measuring from one side and the thirty-eighth measuring from the other side of the machine—that is to say, at $o$. If the neutral point were found at some other portion of the rheostat, the location of the leak would be changed relatively to the lamps accordingly.

The resistance $g$ I consider desirable but by no means essential to the operation of my device. It is also evident that the form of the connection $h$ may be changed without departing from my invention. For example, an ordinary lever-switch might be used, as shown in Fig. 2.

The electrical conditions governing the operation of my apparatus will be readily understood by those familiar with the Wheatstone bridge or balance—that is to say, the lamp-circuit may be considered as constituting two arms of the bridge, the rheostat two other arms thereof, while the dynamo takes the place of the test-battery, and the ground branch $e$, when connected to the rheostat, takes the place of the bridge-wire, and the galvanometer therefore takes the usual place of the galvanometer when in connection with the Wheatstone bridge.

I have described my apparatus in connection with electric-arc lamps. It is evident, however, that it may be applied to circuits containing any other electric-translating devices.

Having thus described my invention, I claim as new and desire to secure by Letters Patent—

1. The combination, with an electric circuit including translating devices and a dynamo-machine for supplying said circuit, of branch circuits $c\,d$ from opposite sides of said dynamo-machine, provided each with a movable connecting device, a rheostat with which said connecting device may be connected at will to include the rheostat between the terminals of the dynamo-machine, and a ground branch including a galvanometer and provided with a movable switching device or plug for connecting said branch with different portions of said rheostat, whereby the neutral point of the rheostat with respect to a leak on the circuit may be determined, substantially as specified.

2. The combination, with an electric circuit containing translating devices and an electric generator, of a rheostat adapted to be connected with different sides of said generator and a ground branch including a condenser, a galvanometer, and a discharging device, said ground branch being adapted to be connected between different coils of the rheostat, whereby the location of any accidental leak on the lamp-circuit may be approximately located.

3. The combination, with an arc-light circuit including a dynamo, of connecting devices on different sides of said dynamo, a condenser, with the opposite ends of which said connecting devices are adapted to be connected, respectively, and an indicating device adapted to be connected to different portions of said rheostat to determine the neutral point thereof with respect to any leak that may exist at any point of the lamp-circuit, substantially as and for the purpose specified.

In witness whereof I hereunto subscribe my name this 12th day of November, A. D. 1888.

CHARLES H. RUDD.

Witnesses:
GEORGE P. BARTON,
ELLA EDLER.